United States Patent
Sommer et al.

(10) Patent No.: US 9,676,894 B2
(45) Date of Patent: Jun. 13, 2017

(54) AQUEOUS POLYURETHANE DISPERSIONS

(75) Inventors: Stefan Sommer, Leverkusen (DE);
Erhard Luehmann, Bomlitz (DE);
Julián Flores, Barcelona (ES)

(73) Assignee: Covestro Deutschland AG, Leverkusen (DE)

( * ) Notice: Subject to any disclaimer, the term of this patent is extended or adjusted under 35 U.S.C. 154(b) by 305 days.

(21) Appl. No.: 13/580,287

(22) PCT Filed: Feb. 25, 2011

(86) PCT No.: PCT/EP2011/052783
§ 371 (c)(1),
(2), (4) Date: Oct. 31, 2012

(87) PCT Pub. No.: WO2011/107398
PCT Pub. Date: Sep. 9, 2011

(65) Prior Publication Data
US 2013/0041072 A1 Feb. 14, 2013

(30) Foreign Application Priority Data
Mar. 2, 2010 (DE) .......... 10 2010 009 896

(51) Int. Cl.
| | | |
|---|---|---|
| C09D 175/00 | (2006.01) | |
| C08G 18/08 | (2006.01) | |
| C08G 18/42 | (2006.01) | |
| C09D 175/16 | (2006.01) | |
| C08G 18/62 | (2006.01) | |
| C08G 18/12 | (2006.01) | |
| C08G 18/32 | (2006.01) | |
| C08G 18/34 | (2006.01) | |
| C08G 18/65 | (2006.01) | |
| C08G 18/67 | (2006.01) | |
| C08G 18/68 | (2006.01) | |
| C08G 18/75 | (2006.01) | |
| C09D 175/14 | (2006.01) | |

(52) U.S. Cl.
CPC ...... *C08G 18/0823* (2013.01); *C08G 18/0866* (2013.01); *C08G 18/12* (2013.01); *C08G 18/3206* (2013.01); *C08G 18/348* (2013.01); *C08G 18/4288* (2013.01); *C08G 18/6237* (2013.01); *C08G 18/6241* (2013.01); *C08G 18/6245* (2013.01); *C08G 18/6541* (2013.01); *C08G 18/6564* (2013.01); *C08G 18/67* (2013.01); *C08G 18/68* (2013.01); *C08G 18/758* (2013.01); *C09D 175/14* (2013.01); *C09D 175/16* (2013.01)

(58) Field of Classification Search
CPC ............... C09D 175/14; C09D 175/16; C08G 18/0823; C08G 18/0866; C08G 18/4288; C08G 18/6237; C08G 18/6241; C08G 18/6245

USPC .... 525/452, 455, 28, 44; 524/589, 590, 591, 524/871, 872, 873, 875, 839, 840; 523/415
See application file for complete search history.

(56) References Cited

U.S. PATENT DOCUMENTS

| | | |
|---|---|---|
| 4,108,814 A | 8/1978 | Reiff et al. |
| 5,274,067 A | 12/1993 | Kressdorf et al. |
| 5,391,613 A | 2/1995 | Brindoepke et al. |
| 5,539,018 A | 7/1996 | Luhmann et al. |
| 5,684,081 A | 11/1997 | Dannhorn et al. |
| 6,100,326 A | 8/2000 | Richter et al. |
| 6,207,744 B1 * | 3/2001 | Paulus et al. ............. 524/507 |
| 6,559,225 B1 * | 5/2003 | Irle et al. ............. 524/839 |
| 6,620,893 B1 | 9/2003 | Melchiors et al. |
| 2003/0232955 A1 | 12/2003 | Melchiors et al. |
| 2004/0006152 A1 * | 1/2004 | Weikard et al. ............. 522/162 |
| 2006/0264527 A1 | 11/2006 | Lunzer et al. |
| 2008/0139691 A1 | 6/2008 | Blum et al. |
| 2008/0145563 A1 | 6/2008 | Heischkel et al. |
| 2008/0146748 A1 * | 6/2008 | Blum et al. ............. 525/418 |
| 2008/0194775 A1 | 8/2008 | Blum et al. |
| 2010/0210757 A1 | 8/2010 | Sommer et al. |
| 2011/0236667 A1 | 9/2011 | Blum et al. |

FOREIGN PATENT DOCUMENTS

| | | |
|---|---|---|
| CA | 2253119 A1 | 5/1999 |
| DE | 2446440 A1 | 4/1976 |
| DE | 3 316 592 A1 | 11/1984 |
| DE | 4040290 A1 | 7/1992 |
| DE | 4405208 A1 | 8/1995 |

(Continued)

OTHER PUBLICATIONS

Translation of International Preliminary Report on Patentability for PCT/EP2011/052783 dated Sep. 25, 2012.

(Continued)

*Primary Examiner* — Michael L Leonard
(74) *Attorney, Agent, or Firm* — Drinker Biddle & Reath LLP

(57) ABSTRACT

The present invention relates to radiation-curable, aqueous dispersions based on polyurethane acrylates (i), which are characterized in that the polyurethane acrylate (i) comprises as builder components A) one or more aromatic polyepoxy (meth)acrylates with an OH number of from 20 to 300 mg of KOH/g of substance, C) one or more oligo- or polyesters containing unsaturated fatty acids with an OH number of from 15 to 300 mg of KOH/g of substance and an iodine number of greater than 50 g of $I_2$/100 g of substance, E) one or more compounds with at least one group which is reactive towards isocyanate and additionally at least one group having a hydrophilizing action and F) one or more organic polyisocyanates, a process for the preparation thereof, the use of the coating compositions as lacquers and/or adhesives, and objects and substrates provided with these lacquers and/or adhesives.

15 Claims, No Drawings

(56) References Cited

FOREIGN PATENT DOCUMENTS

| | | |
|---|---|---|
| DE | 19917161 A1 | 10/2000 |
| DE | 102006054237 A1 | 5/2008 |
| DE | 102008000478 A1 | 9/2008 |
| EP | 0017199 A1 | 10/1980 |
| EP | 451590 A2 | 10/1991 |
| EP | 613 915 A1 | 9/1994 |
| EP | 640632 A1 | 3/1995 |
| EP | 0709414 A1 | 5/1996 |
| EP | 753531 A1 | 1/1997 |
| EP | 916647 A2 | 5/1999 |
| EP | 0928799 A1 | 7/1999 |
| EP | 0942022 A1 | 9/1999 |
| EP | 1591502 A1 | 11/2005 |
| EP | 1 914 253 A2 | 4/2008 |
| EP | 1958974 A1 | 8/2008 |
| EP | 2218739 A1 | 8/2010 |
| WO | WO-03106577 A1 | 12/2003 |
| WO | WO-2005021615 A1 | 3/2005 |
| WO | WO-2006047431 A1 | 5/2006 |
| WO | WO-2006089935 A1 | 8/2006 |

OTHER PUBLICATIONS

International Search Report for PCT/EP2011/052783 mailed Jun. 22, 2011.

* cited by examiner

AQUEOUS POLYURETHANE DISPERSIONS

CROSS-REFERENCE TO RELATED APPLICATIONS

This application is a national stage application (under 35 U.S.C. §371) of PCT/EP2011/052783, filed Feb. 25, 2011, which claims benefit of German Application No. 10 2010 009 896.5, filed Mar. 2, 2010, both of which are incorporated herein by reference in their entirety.

The present invention describes oxidatively curable and radiation-curable coating compositions based on aqueous polyurethane dispersions, a process for the preparation thereof, the use of the coating compositions as lacquers and/or adhesives, and objects and substrates provided with these lacquers and/or adhesives.

Radiation-curable aqueous coating systems based on polyurethane dispersions are used in the coating, inter alia, of wood, plastics and leather and are distinguished by a large number of positive properties, such as good resistance to chemicals and mechanical stability. A particular advantage is the split-second curing of the polyurethane top layer by crosslinking of the ethylenic double bonds contained in the polymer with the aid of high-energy radiation. A further advantage of aqueous coating systems is the low viscosity. This is particularly advantageous for spray applications.

A current trend, especially in the furniture industry, is to employ aqueous radiation-curable polyurethane dispersions in pigmented formulations white, black or coloured in shade. In this context, certain colour shades, such as e.g. yellow, red or black, prove to be particularly difficult since they have a very high absorption in wavelength ranges in which the commercially available photoinitiators absorb radiation. The consequence is that the radiation-induced polymerization proceeds incompletely and the coating can be very easily destroyed mechanically or by chemicals. In addition, good adhesion to the substrate is not achieved because the bottom layers of lacquer remain soft (Garrat, P. G., Strahlenhärtung, 1996, p. 115-131, Vincentz Verlag, Hannover).

EP-A 753 531 and EP-A 942 022 describe polyurethane acrylate dispersions inter alia based on polyepoxy(meth)acrylates. The combination with polyester polyols is described, but not the combination with polyesters containing unsaturated fatty acids. The binders described cure only inadequately in colour-pigmented formulations, so that the resistances to chemicals or mechanical influences are deficient.

EP-A 1 914 253 discloses polyurethane acrylate dispersions based on cyclopentadiene-modified polyesters. The cyclopentadiene-modified polyesters can also contain, inter alia, soya oil fatty acid or oleic acid (a2), but these are not essential. Polyepoxy(meth)acrylates inter alia serve as acrylate-containing units. The combination of aromatic polyepoxy(meth)acrylates with polyesters containing unsaturated fatty acids is not disclosed. The binders described in EP-A 1 914 253 have an inadequate profile of properties in a colour-pigmented formulation (see Example 6 in this application).

EP-A 613 915 discloses polyurethane acrylate dispersions containing 20 to 80% of esters containing polyethylene glycol units, unsaturated fatty alcohols or unsaturated acids. Esters containing unsaturated fatty alcohols or unsaturated acids are achieved by reaction of unsaturated fatty acids or acrylic acid with glycidyl esters. Aromatic polyepoxy(meth)acrylates are not described. It can furthermore be seen by the person skilled in the art that the very high content of polyethylene glycol units leads to coatings which are very hydrophilic and therefore susceptible to colouring agents and solvents.

WO-A 2006047431 describes polyurethane dispersions which are radiation-curable and those which are not radiation-curable, which contain polyesters based on hydroformylated unsaturated fatty acids. The double bonds of the unsaturated fatty acids are either hydroformylated or hydrogenated by the hydroformylation. Double bonds for oxidative curing are therefore no longer present in the polyurethane dispersions.

In WO-A 2005021615 in a first step unsaturated fatty acids B) are added on to aromatic epoxides A), in a second step a polyacrylate is grafted on to the double bonds of the fatty acids with (meth)acrylate monomers C) and finally the product obtained in this way is used as an educt for a radiation-curable polyurethane acrylate dispersion. (Meth)acrylate monomers, such as hydroxyethyl and hydroxypropyl(meth)acrylate, are employed as the radiation-curable component D) in the synthesis of the polyurethane acrylate dispersion. Since the double bonds of the unsaturated fatty acids have been copolymerized with (meth)acrylate monomers, double bonds for oxidative curing are no longer present in the polyurethane dispersion.

Oxidatively drying lacquer resins based on unsaturated fatty acids and oils are known as alkyd resins (Brock, T.; Groteklaes, M.; Mischke, P., Lehrbuch der Lacktechnologie, 1st ed.; Vincentz: Hannover, 2000, p. 62-65). These are non-aqueous systems which, because of the high viscosity, must be diluted with organic solvents or low molecular weight reactive diluents in order to be employed for spray applications. The emission of organic constituents and/or identification as irritant are disadvantages.

Oxidatively drying aqueous polyurethane dispersions based on alkyd resins are described in DE-A 19917161 and DE-A 102006054237. The lacquers prepared therefrom are dried with atmospheric oxygen at room temperature or at elevated temperature for several hours to days, optionally in the presence of siccatives. Compared with radiation-curable polyurethane dispersions, complete curing is very tedious. Furthermore, the mechanical properties and the chemical resistances are inferior to those of the radiation-curable polyurethane dispersions.

EP-A 451590 and DE-A 4405208 disclose aqueous polyurethane dispersions based on polyesters containing allyl ether. Such dispersions can be both radiation-cured and oxidatively cured. Compared with polyesters containing unsaturated fatty acids, polyesters containing allyl ether are significantly more hydrophilic and lead to poorer chemical resistances in the coating. The combination with polyepoxyacrylates is not described.

The combination of two crosslinking mechanisms, such as e.g. the combination of radiation-induced free radical polymerization with urethanization by addition of non-blocked or blocked polyisocyanates, is likewise known and is called dual cure. Thus, WO-A 03106577 discloses coating compositions containing aqueous, radiation-curable polyurethane dispersions and non-blocked, blocked, hydrophilized and/or non-hydrophilized polyisocyanates. If non-blocked polyisocyanates are used, the pot life of the lacquer must be taken into account, i.e. the lacquer gels within minutes to hours. The pot life has a considerable influence on the working procedure and in the end leads to a large amount of waste, since lacquer which is not required can be neither recycled nor stored. If blocked polyisocyanates are used, the coating must be stoved at temperatures above 100° C. after the radiation curing, in order to effect deblocking of the isocyanate. Such temperatures are a disadvantage for heat-sensitive substrates, such as e.g. wood or plastic.

There was therefore the object of developing radiation-curable aqueous binders which have better chemical and mechanical resistances than hitherto in coloured formulations. In particular, after physical drying they must result in films which are resistant to blocking, and the coatings must have a high resistance to colouring agents and solvents.

It has been found, surprisingly, that radiation-curable aqueous dispersions of polyurethane acrylates achieve good chemical and mechanical resistances in coloured formulations if they are based both on aromatic polyepoxy(meth)acrylates and on oligo- and polyesters containing unsaturated fatty acids. Coloured lacquer coatings based on such binders achieve a significantly higher mechanical strength and better chemical resistances by radiation curing and oxidative curing than was the case hitherto for lacquers based on known polyurethane acrylate dispersions. In this context, the resistance to colouring agents in particular is unexpectedly good. After the split-second radiation curing, the lacquered substrates are already sufficiently resistant to mechanical and chemical stresses to be further processed or assembled. The full resistance of the coating to stresses is achieved within hours to days, depending on how the oxidative curing is carried out. This is an essential advantage over exclusively oxidatively curable systems, since in principle these can be further processed only after hours or days of oxidative curing. The binders according to the invention have no pot life, and crosslinking at elevated temperature is not necessary, since the oxidative crosslinking also takes place at room temperature.

The invention relates to radiation-curable aqueous dispersions based on polyurethane acrylates (i), which are characterized in that the polyurethane acrylate (i) comprises as builder components
A) one or more aromatic polyepoxy(meth)acrylates with an OH number of from 20 to 300 mg of KOH/g of substance,
B) optionally compounds which differ from A) and have at least one group which is reactive towards isocyanate and at least one radiation-curable double bond,
C) one or more oligo- or polyesters containing unsaturated fatty acids with an OH number of from 15 to 300 mg of KOH/g of substance and an iodine number of greater than 50 g of $I_2$/100 g of substance,
D) optionally one or more compounds which have at least one group which is reactive towards isocyanate, but neither radiation-curable nor oxidatively curable double bonds,
E) one or more compounds with at least one group which is reactive towards isocyanate and additionally at least one group having a hydrophilizing action,
F) one or more organic polyisocyanates and
G) optionally compounds which differ from A) to F) and have at least one amine function.

The dispersion optionally contains a component (ii), which comprises reactive diluents containing at least one group which can undergo free radical polymerization.

In the context of this invention, "(meth)acrylate" relates to corresponding acrylate or methacrylate functions or to a mixture of the two.

The OH number was determined in accordance with DIN 53240, and the iodine number in accordance with DIN 53241-1.

In this context, the builder component A) and optionally components B) and (ii) are employed in amounts such that the content of radiation-curable double bonds is between 0.5 and 6.0, preferably between 1.0 and 5.5, particularly preferably between 1.5 and 5.0 mol/kg of non-aqueous constituents of the dispersion.

Component (A) is employed to the extent of 5 to 45 wt. %, preferably 10 to 40 wt. %, particularly preferably 15 to 35 wt. %, components (i) and (ii) adding up to 100 wt. %.

Component C) is employed to the extent of 15 to 65 wt. %, preferably 20 to 55 wt. %, particularly preferably 25 to 50 wt. %, components (i) and (ii) adding up to 100 wt. %.

Preferably, the content of polyethylene glycol units is less than 20 wt. %, based on the sum of all the non-aqueous constituents of the dispersion.

The polyepoxy(meth)acrylates, which are known per se, which contain hydroxyl groups and have an OH number in the range of from 20 to 300 mg of KOH/g, preferably from 100 to 280 mg of KOH/g, particularly preferably from 150 to 250 mg of KOH/g, are suitable as component A). Such compounds are described on page 37 to 56 in P. K. T. Oldring (ed.), Chemistry & Technology of UV & EB Formulations For Coatings, Inks & Paints, vol. 2, 1991, SITA Technology, London. Aromatic polyepoxy(meth)acrylates containing hydroxyl groups are based on reaction products of acrylic acid and/or methacrylic acid with aromatic glycidyl ethers (epoxides), preferably aromatic glycidyl ethers of monomeric, oligomeric or polymeric bisphenol A and/or bisphenol F or alkoxylated derivatives thereof.

The compounds listed under component A) can be used by themselves or also in mixtures.

Component B) comprises one or more compounds chosen from the group consisting of polyester(meth)acrylates, polyether(meth)acrylates, polyether-ester(meth)acrylates and unsaturated polyesters with allyl ether structural units with an OH number in the range of from 15 to 300 mg of KOH/g of substance and monohydroxy-functional alcohols containing (meth)acrylate groups.

Of the polyester(meth)acrylates, the polyester(meth)acrylates which contain hydroxyl groups and have an OH number in the range of from 15 to 300 mg of KOH/g of substance, preferably from 60 to 200 mg of KOH/g of substance, are employed as component B). In total 7 groups of monomer constituents can be used as component B) in the preparation of the hydroxy-functional polyester(meth)acrylates.

The first group (a) contains alkanediols or diols or mixtures of these. The alkanediols have a molecular weight in the range of from 62 to 286 g/mol. The alkanediols are preferably chosen from the group of ethanediol, 1,2- and 1,3-propanediol, 1,2-, 1,3- and 1,4-butanediol, 1,5-pentanediol, 1,6-hexanediol, neopentyl glycol, cyclohexane-1, 4-dimethanol, 1,2- and 1,4-cyclohexanediol, 2-ethyl-2-butylpropanediol. Preferred diols are diols containing ether oxygen, such as diethylene glycol, triethylene glycol, tetraethylene glycol, dipropylene glycol, tripropylene glycol, polyethylene, polypropylene or polybutylene glycols with a number-average molecular weight Mn in the range of from 200 to 4,000, preferably 300 to 2,000, particularly preferably 450 to 1,200 g/mol. Reaction products of the abovementioned diols with ε-caprolactone or other lactones can likewise be employed as diols.

The second group (b) contains trifunctional and more than trifunctional alcohols having a molecular weight in the range of from 92 to 254 g/mol and/or polyethers started on these alcohols. Particularly preferred trifunctional and more than trifunctional alcohols are glycerol, trimethylolpropane, pentaerythritol, dipentaerythritol and sorbitol. A particularly preferred polyether is the reaction product of 1 mol of trimethylolpropane with 4 mol of ethylene oxide.

The third group (c) contains monoalcohols. Particularly preferred monoalcohols are chosen from the group of ethanol, 1- and 2-propanol, 1- and 2-butanol, 1-hexanol, 2-ethylhexanol, cyclohexanol and benzyl alcohol.

The fourth group (d) contains dicarboxylic acids having a molecular weight in the range of from 104 to 600 g/mol and/or anhydrides thereof. Preferred dicarboxylic acids and anhydrides thereof are chosen from the group of phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecandioic acid, hydrogenated dimers of fatty acids such as are listed under the sixth group (f).

The fifth group (e) contains trimellitic acid or trimellitic anhydride.

The sixth group (f) contains monocarboxylic acids, such as e.g. benzoic acid, cyclohexanecarboxylic acid, 2-ethylhexanoic acid, caproic acid, caprylic acid, capric acid, lauric acid, and natural and synthetic fatty acids, such as e.g. lauric, myristic, palmitic, margaric, stearic, behenic, cerotic, palmitoleic, oleic, icosenic, linoleic, linolenic and arachidonic acid.

The seventh group (g) contains acrylic acid, methacrylic acid and/or dimeric acrylic acid.

Suitable polyester(meth)acrylates B) containing hydroxyl groups contain the reaction product of at least one constituent of group (a) or (b) with at least one constituent from group (d) or (e) and at least one constituent from group (g).

Particularly preferred constituents from group (a) are chosen from the group consisting of ethanediol, 1,2- and 1,3-propanediol, 1,4-butanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, chosen from the group of diethylene glycol, triethylene glycol, tetraethylene glycol, dipropylene glycol, and tripropylene glycol. Preferred constituents from group (b) are chosen from the group of glycerol, trimethylolpropane, pentaerythritol or the reaction product of 1 mol of trimethylolpropane with 4 mol of ethylene oxide. Particularly preferred constituents from groups (d) and (e) are chosen from the group of phthalic anhydride, isophthalic acid, tetrahydrophthalic anhydride, hexahydrophthalic acid, hexahydrophthalic anhydride, maleic anhydride, fumaric acid, succinic anhydride, glutaric acid, adipic acid, dodecandioic acid, hydrogenated dimers of fatty acids such as are listed under the 6th group (f) and trimellitic anhydride. The preferred constituent from group (g) is acrylic acid.

Groups having a dispersing action which are generally known from the prior art can optionally also be incorporated into these polyester(meth)acrylates. Thus, polyethylene glycols and/or methoxypolyethylene glycols can be used as a proportion of the alcohol component. Polyethylene glycols and polypropylene glycols started on alcohols and block copolymers thereof and the monomethyl ethers of these polyglycols can be used as compounds. Polyethylene glycol monomethyl ether having a number-average molecular weight Mn in the range of from 500 to 1,500 g/mol is particularly suitable.

It is furthermore possible, after the esterification, to react some of the still free, non-esterified carboxyl groups, in particular those of (meth)acrylic acid, with mono-, di- or polyepoxides. Preferred epoxides are the glycidyl ethers of monomeric, oligomeric or polymeric bisphenol A, bisphenol F, hexanediol and/or butanediol or ethoxylated and/or propoxylated derivatives thereof. This reaction can be used, in particular, for increasing the OH number of the polyester (meth)acrylate, since in each case an OH group is formed in the epoxide-acid reaction. The acid number of the resulting product is between 0 and 20 mg of KOH/g, preferably between 0 and 10 mg of KOH/g and particularly preferably between 0 and 5 mg of KOH/g of substance. The reaction is preferably catalysed by catalysts, such as triphenylphosphine, thiodiglycol, ammonium and/or phosphonium halides and/or compounds of zirconium or tin, such as tin(II) ethylhexanoate.

The preparation of polyester(meth)acrylates is described on page 3, line 25 to page 6, line 24 of DE-A 4 040 290, on page 5, line 14 to page 11, line 30 of DE-A 3 316 592 and page 123 to 135 of P. K. T. Oldring (ed.) in Chemistry & Technology of UV & EB Formulations For Coatings, Inks & Paints, vol. 2, 1991, SITA Technology, London.

Polyether(meth)acrylates which contain hydroxyl groups and originate from the reaction of acrylic acid and/or methacrylic acid with polyethers are likewise suitable as component B), thus e.g. homo-, co- or block copolymers of ethylene oxide, propylene oxide and/or tetrahydrofuran on any desired hydroxy- and/or amine-functional starter molecules, such as e.g. trimethylolpropane, ethylene glycol, propylene glycol, diethylene glycol, dipropylene glycol, glycerol, pentaerythritol neopentyl glycol, butanediol and hexanediol.

Monohydroxy-functional alcohols containing (meth)acrylate groups, such as, for example, 2-hydroxyethyl(meth) acrylate, caprolactone-lengthened modifications of 2-hydroxyethyl(meth)acrylate, such as Pemcure® 12A (Cognis, D E), 2-hydroxypropyl(meth)acrylate, 4-hydroxybutyl (meth)acrylate, 3-hydroxy-2,2-dimethylpropyl(meth)acrylate, the di-, tri- or penta(meth)acrylates, which are on average monohydroxy-functional, of polyhydric alcohols, such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or technical grade mixtures thereof, are likewise suitable as component B).

The reaction products of (meth)acrylic acids with monomeric epoxide compounds which optionally contain double bonds can moreover also be employed as monohydroxyfunctional alcohols containing (meth)acrylate groups. Preferred reaction products are chosen from the group of (meth)acrylic acid with glycidyl(meth)acrylate or the glycidyl ester of a tertiary saturated monocarboxylic acid. Tertiary saturated monocarboxylic acids are, for example, 2,2-dimethylbutyric acid, ethylmethylbutyric, ethylmethylpentanoic, ethylmethylhexanoic, ethylmethylheptanoic and/or ethylmethyloctanoic acid.

Preferred compounds containing unsaturated groups are chosen from the group of polyester(meth)acrylates, polyether(meth)acrylates, 2-hydroxyethyl(meth)acrylate, 2-hydroxypropyl(meth)acrylate, pentaerythritol triacrylate, dipentaerythritol pentaacrylate and the addition product of ethylmethylheptanoic acid glycidyl ester with (meth)acrylic acid and technical grade mixtures thereof.

The compounds listed under component B) can be used by themselves or also in mixtures.

Component C) includes hydroxy-functional oligo- or polyesters containing unsaturated fatty acids with an OH number of from 15 to 300 mg of KOH/g of substance, preferably 50 to 180 mg of KOH/g of substance, particularly preferably 70 to 140 mg of KOH/g of substance, and an iodine number of greater than 50 g of $I_2$/100 g of substance, Oligo- or polyesters containing as builder components di-, tri-, tetrols and/or hexols and unsaturated fatty acids, optionally further saturated aliphatic and/or aromatic di- and tri-acids are suitable as component C).

Di-, tri-, tetrols and/or hexols as builder components for component C) are, for example, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane, ditrimethylolpropane, castor oil, partly dehydrated castor oil, pentaerythritol and/or dipentaerythritol. Unsaturated fatty acids as builder components for component C) are, for example, linseed oil fatty acid, soy bean oil fatty acid, sunflower oil fatty acid, rapeseed oil fatty acid and herring oil fatty acid, distilled products which predominantly (>60 wt. %) contain oleic, linoleic acid, licanic acid, arachidonic acid, palmitoleic acid, ricinoleic acid and linolenic acid; unsaturated fatty acids which correspond in their composition with respect to the fatty acid radical to the naturally occurring fatty acid mixtures such as can be obtained from plant or animal oils, e.g. soy bean oil, tall oil, linseed oil or sunflower oil, are preferred. Saturated aliphatic and/or aromatic di- and tri-acids can optionally also be present, such as, for example, phthalic acid, isophthalic acid, terephthalic acid, trimellitic acid, adipic acid, hexahydrophthalic acid, malonic acid, succinic acid, glutaric acid, pimelic acid, suberic acid, sebacic acid, dodecanedioic acid, hydrogenated dimer fatty acids, trimellitic acid and analogous anhydrides thereof.

Partly dehydrated castor oil, which is obtained by exposing castor oil to heat under acid catalysis and is described in EP-A 709 414 (p. 2, l. 37-40), is likewise suitable as component C).

Esterification and transesterification products of unsaturated fatty acids and/or unsaturated oils with at least bifunctional polyol compounds, preferably tri- and tetra-functional hydroxyl components, such as, for example, trimethylolethane, trimethylolpropane, glycerol, castor oil and pentaerythritol, are likewise suitable as component C). Such transesterification products are described in EP-A 017 199 (p. 10, l. 27 to p. 11 l. 31).

Further suitable products containing unsaturated fatty acids are described in EP-A 640 632 (p. 2 l. 50-58 and p. 3 l. 10-14). They are obtained by esterification of unsaturated fatty acids and/or unsaturated oils with polyols. Examples of such fatty acids which may be mentioned are linoleic acid, licanic acid, arachidonic acid, palmitoleic acid and/or linolenic acid, preferably those which are fatty acid mixtures of plant or animal oils, e.g. soy bean oil, tall oil, linseed oil or sunflower oil, which are transesterified with polyols, such as e.g. trimethylolethane, trimethylolpropane, glycerol or pentaerythritol. Transesterification products of unsaturated oils, such as, for example, dehydrogenated castor oil, sunflower oil, soy bean oil, linseed oil, tall oil, olive oil or mixtures of these, with trimethylolethane, trimethylolpropane, glycerol or pentaerythritol are particularly preferred.

Preferred components C) are reaction products of unsaturated fatty acids, such as e.g. oleic acid, lauric acid, linoleic acid or linolenic acid, with castor oil in the presence of glycerol and/or reaction products of unsaturated oils with castor oil. Preferred unsaturated fatty acids are those which are unsaturated fatty acid mixtures which can be obtained from plant or animal oils, such as e.g. soy bean oil, tall oil, linseed oil, sunflower oil or olive oil.

Component C) is particularly preferably the transesterification product of castor oil and one or more oils with an iodine number of greater than 100.

The transesterification product of castor oil and soy bean oil is very particularly preferred as component C).

Mixtures of the components C) described are likewise suitable.

Component D) comprises monomeric mono-, di- and/or triols in each case having a molecular weight of from 32 to 240 g/mol, such as e.g. methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane and/or castor oil. Neopentyl glycol, 1,4-butanediol, 1,4-cyclohexanedimethanol, 1,6-hexanediol and/or trimethylolpropane are preferred.

Component D) furthermore comprises oligomeric and/or polymeric hydroxy-functional compounds. These oligomeric and/or polymeric hydroxy-functional compounds are, for example, polyesters, polycarbonates, polyether-carbonate polyols, C2-, C3- and/or C4-polyethers, polyether esters and/or polycarbonate polyesters having a functionality of from 1.0 to 3.0, in each case with a weight-average of the molecular weight $M_w$ in the range of from 300 to 4,000, preferably 500 to 2,500 g/mol.

Hydroxy-functional polyester alcohols are those based on mono-, di- and tricarboxylic acids with monomeric di- and triols, such as have already been listed as component D), and polyester alcohols based on lactones. The carboxylic acids are, for example, phthalic acid, isophthalic acid, terephthalic acid, trimellitic acid, adipic acid, hexahydrophthalic acid, malonic acid, succinic acid, glutaric acid, pimelic acid, suberic acid, sebacic acid, dodecanedioic acid, hydrogenated dimers of fatty acids and saturated fatty acids, such as e.g. palmitic acid and stearic acid. Of the di- and tricarboxylic acids, the analogous anhydrides can also be used.

Hydroxy-functional polyether-ols are obtainable, for example, by polymerization of cyclic ethers or by reaction of alkylene oxides with a starter molecule.

Hydroxy-functional polycarbonates are hydroxyl-terminated polycarbonates, the polycarbonates accessible by reaction of diols, lactone-modified diols or bisphenols, e.g. bisphenol A, with phosgene or carbonic acid diesters, such as diphenyl carbonate or dimethyl carbonate. Hydroxy-functional polyether carbonate polyols are those such as are described for building up polyurethane dispersions in DE 102008000478 A.

The compounds listed under component D) can be used by themselves or also in mixtures.

Component E) comprises compounds with at least one group which is reactive towards isocyanate and additionally at least one group having a hydrophilizing action.

The groups having a hydrophilizing action include ionic groups E1) and/or the ionic groups E1) which originate from potentially ionic groups E2) (for example by salt formation) and which can be of anionic nature E1.1), such as, for example, sulfonium, phosphonium, carboxylate, sulfonate, phosphonate groups, or of cationic nature E1.2), such as, for example, ammonium groups, potentially ionic groups E2), i.e. groups which can be converted into ionic groups E1), for example by salt formation, and/or nonionic groups E3), such as, for example, polyether groups, which can be incorporated into the macromolecules by isocyanate-reactive groups. Isocyanate-reactive groups which are preferably suitable are hydroxyl and amino groups.

Compounds containing potentially ionic groups E2) include compounds with potentially anionic groups E2.1), such as, for example, mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and/or compounds with potentially cationic groups E2.2), such as, for example, ethanolamine, diethanolamine, triethanolamine, 2-propanolamine, dipropanolamine, tripropanolamine, N-methylethanolamine, N-methyl-diethanolamine and N,N-dimethylethanolamine.

Preferred compounds containing potentially anionic groups E2.1) are chosen from the group consisting of dimethylolpropionic acid, dimethylolbutyric acid, hydroxypivalic acid, N-(2-aminoethyl)-alanine, 2-(2-aminoethylamino)-ethanesulfonic acid, ethylenediamine-propyl- or -butylsulfonic acid, 1,2- or 1,3-propylenediamine-ethylsulfonic acid, 3-(cyclohexylamino)propane-1-sulfonic acid, malic acid, citric acid, glycollic acid, lactic acid, glycine, alanine, taurine, lysine, 3,5-diaminobenzoic acid, an addition product of isophoronediamine (1-amino-3,3,5-trimethyl-5-aminomethylcyclohexane, IPDA) and acrylic acid (EP-A 916 647, Example 1), the adduct of sodium bisulfite on but-2-ene-1,4-diol polyether sulfonate and the propoxylated adduct of 2-butenediol and $NaHSO_3$, as described in DE-A 2 446 440 on page 5-9, formula I-III.

Particularly preferred compounds containing potentially ionic groups E2) are compounds containing carboxyl, sulfonic acid groups and/or tertiary amino groups, such as, for example, 2-(2-amino-ethylamino)-ethanesulfonic acid, 3-(cyclohexylamino)propane-1-sulfonic acid, the addition product of isophoronediamine and acrylic acid (EP 916 647 A1, Example 1), hydroxypivalic acid, dimethylolpropionic acid, triethanolamine, tripropanolamine, N-methyldiethanolamine and/or N,N-dimethylethanolamine Component E) very particularly preferably comprises hydroxypivalic acid and/or dimethylolpropionic acid as compounds with potentially ionic groups.

Suitable groups E3) having a non-ionically hydrophilizing action are, for example, polyalkylene oxide ethers which contain at least one hydroxyl or amino group and one or more alkylene oxide units, at least one of which is an ethylene oxide unit. These polyalkylene oxide ethers are accessible in a manner known per se by alkoxylation of suitable starter molecules.

Suitable starter molecules are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole. Trimethylolpropane which is alkoxylated on only one OH group is likewise suitable. Preferred starter molecules are saturated monoalcohols and trimethylolpropane which is alkoxylated on only one OH group. Diethylene glycol monobutyl ether is particularly preferably used as the starter molecule.

Alkylene oxides which are suitable for the alkoxylation reaction are, for example, ethylene oxide, 1-butene oxide and propylene oxide, which can be employed in the alkoxylation reaction in any desired sequence or also in a mixture.

The polyalkylene oxide polyether alcohols are either pure polyethylene oxide polyethers or mixed polyalkylene oxide polyethers, the alkylene oxide units of which include ethylene oxide units to the extent of at least 30 mol %, preferably to the extent of at least 40 mol %. Preferred nonionic compounds are monofunctional mixed polyalkylene oxide polyethers which contain at least 40 mol % of ethylene oxide units and not more than 60 mol % of propylene oxide units. Polyalkylene oxides which are started on trimethylolpropane and have an OH functionality of 2, such as e.g. Tegomer® D 3403 (Evonik Industries AG, Essen, Del.) and Ymer® N 120 (Perstorp A B, Sweden) are likewise preferred.

The acids mentioned under component E2.1) are converted into the corresponding salts by reaction with neutralizing agents, such as triethylamine, ethyldiisopropylamine, dimethylcyclohexylamine, dimethylethanolamine, ammonia, N-ethylmorpholine, LiOH, NaOH and/or KOH. In this context, the degree of neutralization is preferably between 50 and 125%. The degree of neutralization is defined as follows: In the case of acid-functionalized polymers, as the quotient of base and acid; in the case of base-functionalized polymers, as the quotient of acid and base. If the neutralization is above 100%, in the case of acid-functionalized polymers more base is added than there are acid groups in the polymer; in the case of base-functionalized polymers more acid is added than there are base groups in the polymer.

The bases mentioned under component E2.2) are converted into the corresponding salts by reaction with neutralizing agents, such as e.g. inorganic acids, such as, for example, hydrochloric acid, phosphoric acid and/or sulfuric acid, and/or organic acids, such as, for example, formic acid, acetic acid, lactic acid, methane-, ethane- and/or p-toluenesulfonic acid. In this context, the degree of neutralization is preferably between 50 and 125%.

The compounds listed under component E) can also be used in mixtures.

The ionic hydrophilization and the combination of ionic and nonionic hydrophilization are preferred over the purely nonionic hydrophilization.

Component F) comprises polyisocyanates chosen from the group of aromatic, araliphatic, aliphatic or cycloaliphatic polyisocyanates or mixtures of such polyisocyanates. Suitable polyisocyanates are, for example, 1,3-cyclohexane-diisocyanate, 1-methyl-2,4-diisocyanato-cyclohexane, 1-methyl-2,6-diisocyanato-cyclohexane, tetramethylene-diisocyanate, 4,4'-diisocyanatodiphenylmethane, 2,4'-diisocyanatodiphenylmethane, 2,4-diisocyanatotoluene, 2,6-diisocyanatotoluene, $\alpha,\alpha,\alpha',\alpha'$-tetramethyl-m- or -p-xylylene-diisocyanate, 1,6-hexamethylene-diisocyanate, 1-isocyanato-3,3,5-trimethyl-5-isocyanatomethylcyclohexane (isophorone-diisocyanate or IPDI), 4,4'-diisocyanato-dicyclohexylmethane, 1,3-bis(isocyanato-methyl)benzene (XDI), 1,3-bis(1-isocyanato-1-methylethyl)-benzene (TMXDI), 4-isocyanatomethyl-1,8-octane-diisocyanate (triisocyanatononane, TIN) (EP-A 928 799), homologues or oligomers of these polyisocyanates listed with biuret, carbodiimide, isocyanurate, allophanate, iminooxadiazinedione and/or uretdione groups, and mixtures thereof.

Compounds with at least two free isocyanate groups, at least one allophanate group and at least one C=C double bond which can undergo free radical polymerization and is bonded via the allophanate group, such as are described as component a) in WO 2006089935 A1, are likewise suitable as component F).

1,6-Hexamethylene-diisocyanate, 1-isocyanato-3,3,5-trimethyl-5-isocyanatomethylcyclohexane (isophorone-diisocyanate or IPDI) and 4,4'-diisocyanato-dicyclohexylmethane, homologues or oligomers of 1-isocyanato-3,3,5-trimethyl-5-isocyanatomethylcyclohexane (isophorone-diisocyanate or IPDI) and 4,4'-diisocyanato-dicyclohexylmethane with biuret, carbodiimide, isocyanurate, allophanate, iminooxadiazinedione and/or uretdione groups and mixtures thereof are preferred.

The compounds listed under component F) can be used by themselves or also in mixtures.

Mono- and diamines and/or mono- or difunctional amino alcohols are used as component G) to increase the weight-average molecular weight $M_w$ of the polyurethane acrylates. Preferred diamines are those which are more reactive towards the isocyanate groups than water, since the lengthening of the polyester-urethane(meth)acrylates optionally takes place in an aqueous medium. The diamines are particularly preferably chosen from the group of ethylenediamine, 1,6-hexamethylenediamine, isophoronediamine, 1,3-phenylenediamine, 1,4-phenylenediamine, piperazine, 4,4'-diphenylmethanediamine, amino-functional polyethylene oxides, amino-functional polypropylene oxides (known under the name Jeffamin® D series (Huntsman Corp. Europe, Zavantem, Belgium) and hydrazine. Ethylenediamine is very particularly preferred.

Preferred monoamines are chosen from the group of butylamine, ethylamine and amines of the Jeffamin® M series (Huntsman Corp. Europe, Zavantem, Belgium), amino-functional polyethylene oxides, amino-functional polypropylene oxides and/or amino alcohols.

The aqueous dispersions according to the invention based on polyurethane acrylates (i) are preferably free from unsaturated polyester resin modified with dicyclopentadiene.

Component (ii) comprises reactive diluents, by which are to be understood compounds which contain at least one group which can undergo free radical polymerization, preferably acrylate and methacrylate groups, and preferably no groups which are reactive towards isocyanate or hydroxyl groups.

Preferred compounds (II) contain 2 to 6, particularly preferably 4 to 6 (meth)acrylate groups.

Particularly preferred compounds (II) have a boiling point of more than 200° C. under normal pressure.

Reactive diluents are described generally in P. K. T. Oldring (editor), Chemistry & Technology of UV & EB Formulations for Coatings, Inks & Paints, vol. II, chapter III: Reactive Diluents for UV & EB Curable Formulations, Wiley and SITA Technology, London 1997.

Reactive diluents are, for example, the alcohols methanol, ethanol, 1-propanol, 1-butanol, 1-pentanol, 1-hexanol, 2-propanol, 2-butanol, 2-ethylhexanol, dihydrodicyclopentadienol, tetrahydrofurfuryl alcohol, 3,3,5-trimethylhexanol, octanol, decanol, dodecanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), tricyclodecanedimethanol, glycerol, trimethylolethane, trimethylolpropane, trimethylolbutane, pentaerythritol, ditrimethylolpropane, dipentaerythritol and sorbitol, and ethoxylated and/or propoxylated derivatives of the alcohols listed, esterified completely with (meth)acrylic acid, and the technical grade mixtures obtained during (meth)acrylation of the abovementioned compounds.

Component (ii) is preferably chosen from the group of (meth)acrylates of tetrols and hexols, such as e.g. (meth) acrylates of pentaerythritol, ditrimethylolpropane, dipentaerythritol, sorbitol, ethoxylated, propoxylated or alkoxylated pentaerythritol, ditrimethylolpropane, dipentaerythritol, sorbitol and ethoxylated and/or propoxylated derivatives of the alcohols listed and the technical grade mixtures obtained during (meth)acrylation of the abovementioned compounds.

All the processes known from the prior art can be used for the preparation of the dispersions according to the invention, such as emulsifier-shearing force, acetone, prepolymer mixing, melt emulsification, ketimine and solid spontaneous dispersing processes or derivatives thereof. A summary of these methods is found in Methoden der Organischen Chemie, Houben-Weyl, 4th edition, volume E20/part 2 on page 1682, Georg Thieme Verlag, Stuttgart, 1987. The melt emulsification and the acetone process are preferred. The acetone process is particularly preferred.

The invention also provides a process for the preparation of radiation-curable aqueous dispersions based on polyurethane acrylates (i), characterized in that a polyurethane acrylate (i) is obtained by reaction of components A) to E) with component F) in one or more reaction steps, it being possible for a neutralizing agent to be added before, during or after the preparation of the addition product of A) to F) to produce the ionic groups necessary for the dispersing operation, followed by a dispersing step by addition of water to the addition product of A) to F) or transfer of the addition product of A) to F) into an aqueous reservoir, it being possible for chain lengthening by means of component G) to be carried out before, during or after the dispersing.

The invention also provides a process according to the above description, in which one or more reactive diluents (component (ii)) containing at least one group which can undergo free radical polymerization are admixed.

For the preparation of radiation-curable aqueous dispersions based on polyurethane acrylates (i), components A) to E) are initially introduced into the reactor and optionally diluted with acetone. Component (ii) can optionally also be added to components A) to E). It is furthermore possible to add the catalysts for urethanization which are known in the art, such as e.g. dibutyltin dilaurate, tin(II) octoate and bismuth(III) octoate. As a rule, the mixture is heated to 30 to 60° C. in order to start the reaction. The polyisocyanate or polyisocyanates F) is or are then metered in. The reverse variant is also possible, the polyisocyanates F) then being initially introduced and the isocyanate-reactive components A) to E) being added. Components A) to E) can also be added successively and in any desired sequence. Stepwise reaction of the components is likewise possible, that is to say the separate reaction of component F) with one or more isocyanate-reactive components A) to E) before the adduct obtained is reacted further with the components which have not yet been used.

To monitor the reaction, the isocyanate content is determined at regular intervals via titration or infra-red or near infra-red spectroscopy.

The molar ratios of isocyanate groups in F) to groups in A) to E) which are reactive towards isocyanate are from 0.8:1 to 2.5:1, preferably 1.2:1 to 1.5:1.

After the preparation of the polyurethane acrylate (i) by the process according to the invention from components A) to F), salt formation of the groups of component E) having a dispersing action takes place, if this has not yet been carried out in the starting molecules. In the case where component E) contains acid groups, bases chosen from the group of triethylamine, ethyldiisopropylamine, dimethylcyclohexylamine, dimethylethanolamine, ammonia, N-ethylmorpholine, LiOH, NaOH and/or KOH are preferably employed. In the case where component E) contains basic groups, acids chosen from the group of lactic acid, acetic acid, phosphoric acid, hydrochloric acid and/or sulfuric acid are preferably employed. If compounds containing only ether groups are employed as component E), this neutralization step is omitted.

Thereafter, a reactive diluent (ii) or a mixture of reactive diluents (ii) can optionally be added. Component (ii) is preferably admixed in at 30 to 45° C. As soon as this has dissolved, the last reaction step in which in the aqueous medium an increase in the molecular weight and the formation of the dispersions required for the coating system according to the invention take place optionally follows. The polyurethane acrylate (i) synthesized from components A) to F) and optionally the reactive diluent or diluents (ii), optionally dissolved in acetone, is either introduced into the dispersing water, which contains the amine or amines G), with vigorous stirring, or, conversely, the dispersing water/amine mixture is stirred into the polyurethane acrylate solution. The dispersions contained in the coating system according to the invention are moreover formed. The amount of amine G) employed depends on the unreacted isocyanate groups still present. The reaction of the still free isocyanate groups with the amine G) can take place to the extent of 35% to 150%. In the case where a deficiency of amine G) is employed, still free isocyanate groups react slowly with water. If an excess of amine G) is used, unreacted isocyanate groups are no longer present and an amine-functional polyurethane is obtained. Preferably, 80% to 110%, particularly preferably 90% to 100% of the still free isocyanate groups are reacted with the amine G).

In a further variant, it is possible for the increase in the molecular weight by the amine G) already to be carried out in acetone solution, i.e. before the dispersing, and optionally before or after the addition of the reactive diluent or diluents (ii).

In a further variant, it is possible to carry out the increase in molecular weight by the amine G) after the dispersing step.

If desired, the organic solvent—if present—can be distilled off. The dispersions then have a solids content of from 20 to 60 wt. %, in particular 30 to 58 wt. %.

It is likewise possible to carry out the dispersing step in parallel, that is to say simultaneously or at least partly simultaneously.

The invention also provides the use of the radiation-curable aqueous dispersions according to the invention for the production of coatings, in particular of lacquers and adhesives.

After removal of the water by conventional methods, such as heat, thermal radiation, moving optionally dried air and/or microwaves, the dispersions according to the invention give clear films. Thereafter, the radiation curing and the oxidative curing are carried out. In this context, the sequence of the two types of curing is as desired. Preferably, the radiation curing is carried out first, and thereafter the oxidative curing.

Electromagnetic radiation of which the energy, optionally with the addition of suitable photoinitiators, is sufficient to effect free radical polymerization of (meth)acrylate double bonds is suitable for polymerization induced by radiation chemistry.

The polymerization induced by radiation chemistry is preferably carried out by means of radiation with a wavelength of less than 400 nm, such as UV, electron, x- or gamma rays. UV radiation is particularly preferred, the curing with UV radiation being initiated in the presence of photoinitiators. A distinction is made in principle between two type of photoinitiators, the unimolecular (type I) and the bimolecular (type II). Suitable (type I) systems are aromatic ketone compounds, such as e.g. benzophenones in combination with tertiary amines, alkylbenzophenones, 4,4'-bis (dimethylamino)benzophenones (Michler's ketone), anthrone and halogenated benzophenones or mixtures of the types mentioned. (Type II) initiators, such as benzoin and its derivatives, benzil ketals, acylphosphine oxides, 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable. Photoinitiators which can easily be incorporated into aqueous coating compositions are preferred. Such products are, for example, Irgacure® 500 (a mixture of benzophenone and (1-hydroxycyclohexyl) phenyl ketone, Ciba, Lampertheim, Del.), Irgacure® 819 DW (phenyl-bis-(2,4,6-trimethylbenzoyl)-phosphine oxide, Ciba, Lampertheim, Del.), Esacure® KIP EM (oligo-[2-hydroxy-2-methyl-1-[4-(1-methylvinyl)-phenyl]-propanone], Lamberti, Aldizzate, Italy). Mixtures of these compounds can also be employed.

Polar solvents, such as e.g. acetone and isopropanol, can also be employed for incorporation of the photoinitiators.

The radiation curing is advantageously carried out at 30 to 70° C., because the degree of conversion of (meth)acrylate groups tends to be increased at a higher temperature. This can result in better resistance properties. Nevertheless, a possible heat-sensitivity of the substrate must be taken into consideration during UV curing, so that optimum curing conditions for a particular coating composition/substrate combination are to be determined by the person skilled in the art in simple preliminary experiments.

In this context, the radiation emitter or emitters which initiate the free radical polymerization can be fixed in position and the coated substrate is moved past the emitter by suitable conventional devices, or the radiation emitters can be moved by conventional devices, so that the coated substrates are fixed in position during the curing. It is also possible to carry out the irradiation e.g. in chambers, where the coated substrate is introduced into the chamber and the radiation is then switched on for a certain period of time, and after the irradiation the substrate is removed from the chamber again.

If appropriate, curing is carried out under an inert gas atmosphere, i.e. with exclusion of oxygen, in order to prevent inhibition of the free radical crosslinking by oxygen.

Instead of the radiation curing, curing thermally by means of free radicals can also be carried out. Water-soluble peroxides or aqueous emulsions of initiators which are not water-soluble are suitable for this. These agents which form free radicals can be combined with accelerators in a known manner.

The oxidative curing takes place under oxygen. In this context, atmospheric oxygen is as a rule sufficient.

For oxidative curing, it is possible to heat the substrates at 30° C. to 200° C. for several hours in order to accelerate the oxidative crosslinking. However, the oxidative crosslinking also takes place at room temperature.

To accelerate the oxidative crosslinking, siccatives can be added, such as e.g. salts of lead, cobalt, iron, manganese and copper.

The aqueous radiation-curable polyurethane dispersions according to the invention can be applied to the most diverse substrates by the conventional techniques, preferably spraying, rolling, flooding, printing, knife-coating, pouring, brushing and dipping.

In principle, all substrates can be lacquered or coated with the aqueous radiation-curable polyurethane dispersions according to the invention. Preferred substrates are chosen from the group consisting of mineral bases, wood, wood materials, furniture, parquet flooring, doors, window frames, metallic objects, plastics, paper, cardboard, cork, mineral substrates, textiles or leather. They are suitable here as a primer and/or as a top lacquer. In addition, the aqueous radiation-curable polyurethane dispersions according to the invention can also be employed in or as adhesives, e.g. in contact adhesives, in heat-activated adhesives or in laminating adhesives.

The aqueous radiation-curable polyurethane dispersions according to the invention can be employed by themselves but also in binder mixtures with other dispersions. These can be dispersions which likewise contain unsaturated groups, such as e.g. dispersions which contain unsaturated polymerizable groups and are based on polyester, polyurethane, polyepoxy(meth)acrylate, polyether, polyamide, polysiloxane, polycarbonate, polyester acrylate, polyurethane polyacrylate and/or polyacrylate.

The coating systems according to the invention can also comprise those dispersions based on polyesters, polyurethanes, polyethers, polyamides, polyvinyl esters, polyvinyl ethers, polysiloxanes, polycarbonates and/or polyacrylates which contain functional groups, such as alkoxysilane groups, hydroxyl groups and/or isocyanate groups optionally present in blocked form. Dual cure systems which can be cured via two different mechanisms can thus be prepared.

So-called crosslinking agents can furthermore likewise be added to the coating system according to the invention for dual cure systems. Non-blocked and/or blocked polyisocyanates, polyaziridines, polycarbodiimides and melamine resins are preferably possible. Non-blocked and/or blocked hydrophilized polyisocyanates are particularly preferred for aqueous coating compositions. Preferably ≤20 wt. %, particularly preferably ≤10 wt. % of solid crosslinking agent, based on the solids content of the coating composition, is added.

The coating systems according to the invention can also comprise dispersions based on polyesters, polyurethanes, polyethers, polyamides, polysiloxanes, polyvinyl ethers, polybutadienes, polyisoprenes, chlorinated rubbers, polycarbonates, polyvinyl esters, polyvinyl chlorides, polyacrylates, polyurethane polyacrylates, polyester acrylates, polyether acrylates, alkyds, polyepoxides or polyepoxy(meth)acrylates which contain no functional groups. The degree of crosslinking density can thus be reduced, the physical drying can be influenced, e.g. accelerated, or an elastification or also an adjustment of the adhesion can be carried out.

Amino crosslinkinker resins, on a melamine or urea basis, and/or polyisocyanates with free or with blocked polyisocyanate groups, based on polyisocyanates, optionally containing hydrophilizing groups, from hexamethylene-diisocyanate, isophorone-diisocyanate and/or toluoylidene-diisocyanate with urethane, uretdione, iminooxadiazinedione, isocyanurate, biuret and/or allophanate structures can also be added to the coating composition which comprises the aqueous radiation-curable polyurethane acrylates according to the invention. Carbodiimides or polyaziridines are also possible as further crosslinking agents.

The binders, auxiliary substances and additives known in lacquer technology, such as e.g. pigments, dyestuffs or matting agents, can be added to or combined with the coating compositions according to the invention. These are flow and wetting additives, slip additives, pigments, including metallic effect pigments, fillers, nanoparticles, light stabilizer particles, anti-yellowing additives, thickeners and additives for reducing surface tension.

The coating compositions according to the invention are suitable for coatings on films, deformation of the coated film taking place between the oxidative drying and UV curing.

The coating compositions according to the invention are suitable for clear lacquer uses on substrates of wood and plastic, where blocking resistance after physical drying and good resistances to chemicals after radiation curing are important.

The coating compositions according to the invention are particularly suitable in pigmented formulations for the production of coatings for wood and plastics.

The coating compositions according to the invention are very particularly suitable in colour- and black-pigmented formulations for the production of coatings for wood and plastics.

The present invention likewise provides coating compositions comprising the radiation-curable aqueous dispersions according to the invention based on polyurethane acrylate, and crosslinking agents based on amino resins, blocked polyisocyanates, non-blocked polyisocyanates, polyaziridines and/or polycarbodiimides, and/or one or more further dispersions.

This invention furthermore provides substrates coated with the coating compositions according to the invention.

EXAMPLES

The NCO content was in each case monitored titrimetrically in accordance with DIN 53185.

The solids content of the polyurethane dispersion was determined gravimetrically after all the non-volatile constituents had been evaporated off, in accordance with DIN 53216.

The average particle size was determined by laser correlation spectroscopy.

The flow time was determined in accordance with DIN 53211 with the aid of the 4 mm DIN cup.

The OH number was determined in accordance with DIN 53240 using acetic anhydride, and the iodine number in accordance with DIN 53241-1.

Room temperature means 23° C.

1) Polyester Based on Unsaturated Oils.

3,200 g of castor oil and 1,600 g of soya oil as well as 2.4 g of lithium hydroxide were weighed into a 5 l reactor with a distillation attachment. A stream of nitrogen (5 l/h) was passed through the reactant. The mixture was heated up to 240° C. in the course of 140 min. After 7 h at 240° C., the mixture was cooled. OH number: 109 mg of KOH/g of substance, acid number: 3.2 mg of KOH/g of substance, iodine number: 97 mg of $I_2$/100 g of substance.

2) Preparation of a Radiation-Curable Aqueous Polyurethane Dispersion (According to the Invention)

168.9 parts of the bisphenol A diglycidyl diacrylate Agi-Syn® 1010 (AGI Corp., Taipeh, Taiwan), component A), 247.1 parts of polyester 1), component C), 32.0 parts of dimethylolpropionic acid, component E), 323.1 parts of 4,4'-diisocyanatodicyclohexylmethane, component F), and 0.7 part of dibutyltin dilaurate were dissolved in 220 parts of acetone and the solution was reacted at 60° C., while stirring, to an NCO content of 4.0 wt. %. Neutralization was then carried out by addition and stirring in of 21.0 parts of triethylamine, and 78.6 parts of the ditrimethylolpropane tetraacrylate Ebecryl® 140 (Cytec Surface Specialties SA/NV, Drogenbos, Belgium), component (ii), were added. The clear solution was introduced into 1,230 parts of water, while stirring. Thereafter, a mixture of 22.3 parts of ethylenediamine, component G), and 84.0 parts of water was added to the dispersion, while stirring. The acetone was then distilled off from the dispersion under a slight vacuum. A radiation-curable aqueous polyurethane dispersion 2) having a solids content of 37 wt. %, a flow time of 18 sec, an average particle size of 95 nm and a pH of 8.4 was obtained.

3) Preparation of a Radiation-Curable Aqueous Polyurethane Dispersion (According to the Invention)

37.3 parts of the bisphenol A diglycidyl diacrylate Agi-Syn® 1010 (AGI Corp., Taipeh, Taiwan), component A), 120.7 parts of the polyester acrylate AgiSyn® 720 (AGI Corp., Taipeh, Taiwan), component B), 109.8 parts of polyester 1), component C), 8.2 parts of trimethylolpropane, component D), 4.5 parts of 1,4-butanediol, component D), 22.1 parts of dimethylolpropionic acid, component E), 199.9 parts of 4,4'-diisocyanatodicyclohexylmethane, component F), and 0.6 part of dibutyltin dilaurate were dissolved in 175 parts of acetone and the solution was reacted at 60° C., while stirring, to an NCO content of 1.9 wt. %. Neutralization was then carried out by addition and stirring in of 15.2 parts of triethylamine. The clear solution was introduced into 900 parts of water, while stirring. Thereafter, a mixture of 8.1 parts of ethylenediamine, component G), and 24.0 parts of water was added to the dispersion, while stirring. The acetone was then distilled off from the dispersion under a slight vacuum. A radiation-curable aqueous polyurethane dispersion 3) having a solids content of 40 wt. %, a flow time of 24 sec, an average particle size of 146 nm and a pH of 8.8 was obtained.

4) Preparation of a Radiation-Curable Aqueous Polyurethane Dispersion (not According to the Invention)

241.5 parts of the bisphenol A diglycidyl diacrylate Agi-Syn® 1010 (AGI Corp., Taipeh, Taiwan), component A), 127.27 parts of the polyester Desmophen® PE 170 HN (Bayer MaterialScience AG, Leverkusen, Del.), component D), 5.25 parts of neopentyl glycol, component D), 31.98 parts of dimethylolpropionic acid, component E), 323.10 parts of 4,4'-diisocyanatodicyclohexylmethane, component F), and 0.7 part of dibutyltin dilaurate were dissolved in 200 parts of acetone and the solution was reacted at 50° C., while stirring, to an NCO content of 3.7 wt. %. A mixture of 80.50 parts of the propoxylated glycerol triacrylate OTA 480 (Cytec Surface Specialties SA/NV, Drogenbos, Belgium), component (ii), and 78.32 parts of the ditrimethylolpropane tetraacrylate Ebecryl® 140 (Cytec Surface Specialties SA/NV, Drogenbos, Belgium), component (ii), was added to the solution obtained in this way and was stirred in. Neutralization was then carried out by addition and stirring in of 22.93 parts of triethylamine. The clear solution was introduced into 1,150 parts of water, while stirring. Thereafter, a mixture of 22.36 parts of ethylenediamine, component G), and 134.2 parts of water was added to the dispersion, while stirring. The acetone was then distilled off from the dispersion under a slight vacuum. A radiation-curable aqueous polyurethane dispersion 4) having a solids content of 40 wt. %, a flow time of 34 sec, an average particle size of 125 nm and a pH of 8.5 was obtained.

5) Preparation of the Unsaturated Dicyclopentadiene-Modified Polyester Resin a1) from EP-A 1 914 253

42.47 parts of maleic anhydride and 22.95 parts of diethylene glycol were weighed into a high-grade steel apparatus with electrical heating, internal cooling coil, anchor stirrer, reflux condenser, column, glass bridge and nitrogen inlet or pass-over line, the mixture was rendered inert with nitrogen and heated to 150° C. in the course of one hour, while passing nitrogen over and by utilizing the exothermic reaction, and was stirred at this temperature for one hour in order to conclude the formation of the half-ester. After cooling to 140° C., 16.45 parts of dicyclopentadiene were added and the mixture was kept at 140° C. for four hours. At the end of this, the acid number (205+/−5) and OH number (<15) were determined. 5.95 parts of ethylene glycol, 17.73 parts of diethylene glycol and 0.2 part of toluhydroquinone were then added. The mixture was heated up to 190° C. such that the overhead temperature did not rise above 105° C., and was kept at this temperature until an acid number of approx. 12 and a hydroxyl number of from 105 to 125 mg of KOH/g of substance was reached by esterification. After cooling to 150° C., 0.1 part of toluhydroquinone and 0.03 part of trimethylhydroquinone were added. The mixture was then cooled further to 55° C. and dissolved in acetone. A 71% strength solution of a dicyclopentadiene-modified unsaturated polyester resin 5) resulted.

6) Preparation of a Radiation-Curable Aqueous Polyurethane Dispersion Based on an Unsaturated Dicyclopentadiene-Modified Polyester Resin, Example 2) from EP-A 1 914 253 (Not According to the Invention)

158.4 parts of the acetone solution prepared in Example 5), 425.6 parts of the polyester acrylate Laromer® PE 44 F (BASF AG, Ludwigshafen, Del.), component B), 26.8 parts of dimethylolpropionic acid, component E), 50.4 parts of hexamethylene-diisocyanate and 102.2 parts of isophoronediisocyanate, component F), and 0.6 part of dibutyltin dilaurate were dissolved in 180 parts of acetone and the solution was reacted at 50° C., while stirring, to an NCO content of 1.6 wt. %. 20.2 parts of triethylamine were added to the polymer solution obtained in this way and were stirred in. The clear solution formed was then introduced into 1,100 parts of distilled water, while stirring, and a mixture of 10.2 parts of ethylenediamine, component G), and 31.0 parts of water was added to the dispersion, while stirring. The acetone was distilled off from the dispersion under a slight vacuum. Polyurethane dispersion 6) containing an unsaturated dicyclopentadiene-modified polyester and having a solids content of 40 wt. %, a flow time of 27 sec, an average particle size of 112 nm and a pH of 8.1 was obtained.

TABLE 1

Formulations for colour-pigmented systems

| | Yellow-pigmented lacquer [A-1] and red-pigmented lacquer [A-2] without siccative (parts by weight) | Yellow-pigmented lacquer [A-3] and red-pigmented lacquer [A-4] with siccative (parts by weight) |
|---|---|---|
| UV dispersion[1] | 100.0 | 100.0 |
| BYK ® 093[2] | 0.4 | 0.4 |
| BYK ® 346[3] | 0.3 | 0.3 |
| Borchi ® Oxy Coat[4] | — | 0.1 |
| Acematt ® TS 100[5] | 0.5 | 0.5 |

TABLE 1-continued

Formulations for colour-pigmented systems

|  | Yellow-pigmented lacquer [A-1] and red-pigmented lacquer [A-2] without siccative (parts by weight) | Yellow-pigmented lacquer [A-3] and red-pigmented lacquer [A-4] with siccative (parts by weight) |
|---|---|---|
| Aquamatt ® 208[6] | 2.0 | 2.0 |
| Irgacure ® 500[7] | 0.5 | 0.5 |
| Irgacure ® 819 DW[8] | 1.0 | 1.0 |
| Tafigel ® PU 50[9] | 1.6 | 1.6 |
| Pigment Xfast ® (yellow or red)[10] | 5.9 | 5.9 |
| Water | 11.2 | 11.2 |
| Total | 123.4 | 123.5 |

[1]Adapted to 35% solids with water/butyl glycol = 1/1
[2]Defoamer based on polysiloxane from BYK, Wesel, DE
[3]Flow agent based on a polyether-modified hydroxy-functional polydimethylsiloxane from BYK, Wesel, DE
[4]Siccative for oxidative drying based on iron from OMG Borchers GmbH, Langenfeld, DE
[5]Matting agent based on silica from Evonik Industries AG, Essen, DE
[6]Aqueous dispersion of a polyethylene wax from BYK, Wesel, DE
[7]A mixture of benzophenone and (1-hydroxycyclohexyl) phenyl ketone from Ciba, Lampertheim, DE
[8]Phenyl-bis-(2,4,6-trimethylbenzoyl)-phosphine oxide from. Ciba, Lampertheim, DE
[9]Thickener based on polyurethane from Münzing Chemie GmbH, Heilbronn, DE
[10]Yellow pigment: Xfast ® yellow 1256 (arylide yellow), red pigment: Xfast ® red 3860 (diketo-pyrrolo-pyrrole) from BASF SE, Ludwigshafen, DE

TABLE 2

Application and curing conditions for colour-pigmented systems

|  | Pigmented lacquers [A-1], [A-2], [A-3], [A-4] |
|---|---|
| Substrate | wood |
| Application by knife-coating | box knife, 2 × 150 μm, wet film |
| Thermal drying | 10 min, 50° C. |
| Radiation curing | 3 m/min (Ga + Hg), 80 W |

After the thermal drying for evaporation of the water, the coatings of Examples 2, 3 and 4 were very resistant to blocking, i.e. a finger could be pressed on the coating without an impression being left behind. The coating from Example 6 was still slightly tacky and correspondingly sensitive to dust or mechanical destruction. After the radiation curing, the coated substrates were stored for three days at room temperature and then subjected to the tests. During the three days at room temperature, oxidative curing by atmospheric oxygen took place.

TABLE 3

Data on the use testing of the yellow-pigmented lacquer without siccative [A-1], 1 h after the radiation curing, before the oxidative curing Use testing[11]

|  | UV dispersion | | | |
|---|---|---|---|---|
|  | Example 2 | Example 3 | Example 4 (comparison) | Example 6 (EP-A 1 914 253) |
| Resistance to water, 16 h | 4 | 4 | 4 | 3 |
| Resistance to coffee, 16 h | 3 | 3 | 4 | 3 |
| Resistance to red wine, 16 h | 3 | 3 | 4 | 3 |
| Resistance to ethanol/water (50%), 6 h | 3 | 3 | 3 | 1 |
| Resistance to ethanol/water (50%), 16 h | 3 | 3 | 3 | 1 |

[11]The resistance properties are evaluated by visual inspection after the exposure (duration in hours).

Rating 5: No visible changes (no damage)

Rating 4: Slight change in shine or colour shade, only visible if the light source reflects in the test surface on or close to the marking and is reflected directly to the eye of the viewer, or some demarcated markings just detectable (swelling ring detectable, or no softening detectable with the fingernail).

Rating 3: Slight marking to be seen from several viewing angles, for example an almost complete circle or circular area just detectable (swelling ring detectable, scratch tracks of the fingernail detectable)

Rating 2: Severe marking, but the surface structure is largely unchanged. (closed swelling ring, scratch tracks detectable).

Rating 1: Severe marking, but the surface structure is largely unchanged, marking can be scratched through to the substrate.

For the oxidative curing, the coatings were stored at room temperature for three days.

TABLE 4

Data on the use testing of the yellow-pigmented lacquer without siccative [A-1], after radiation curing and oxidative curing Use testing[12]

|  | UV dispersion | | | |
|---|---|---|---|---|
|  | Example 2 | Example 3 | Example 4 (comparison) | Example 6 (EP-A 1 914 253) |
| Resistance to water, 16 h | 4 | 4 | 4 | 3 |
| Resistance to coffee, 16 h | 5 | 5 | 5 | 3 |
| Resistance to red wine, 16 h | 5 | 4 | 4 | 3 |
| Resistance to ethanol/water (50%), 6 h | 4 | 3 | 3 | 1 |
| Resistance to ethanol/water (50%), 16 h | 4 | 3 | 3 | 1 |

[12]see footnote 11, Table 3

TABLE 5

Data on the use testing of the yellow-pigmented lacquer with siccative [A-3], after radiation curing and oxidative curing Use testing[13]

|  | UV dispersion | | | |
|---|---|---|---|---|
|  | Example 2 | Example 3 | Example 4 (comparison) | Example 6 (EP-A 1 914 253) |
| Resistance to water, 16 h | 5 | 5 | 4 | 3 |
| Resistance to coffee, 16 h | 5 | 5 | 5 | 3 |
| Resistance to red wine, 16 h | 5 | 5 | 4 | 3 |
| Resistance to ethanol/water (50%), 6 h | 5 | 4 | 3 | 1 |
| Resistance to ethanol/water (50%), 16 h | 4 | 3 | 3 | 1 |

[13]see footnote 11, Table 3

TABLE 6

Data on the use testing of the red-pigmented lacquer without siccative [A-2], after radiation curing and oxidative curing
Use testing[14]

|  | UV dispersion | | | |
| --- | --- | --- | --- | --- |
|  | Example 2 | Example 3 | Example 4 (comparison) | Example 6 (EP-A 1 914 253) |
| Resistance to water, 16 h | 4 | 4 | 4 | 3 |
| Resistance to coffee, 16 h | 5 | 5 | 5 | 3 |
| Resistance to red wine, 16 h | 5 | 4 | 4 | 3 |
| Resistance to ethanol/water (50%), 6 h | 4 | 3 | 3 | 1 |
| Resistance to ethanol/water (50%), 16 h | 3 | 3 | 3 | 1 |

[14]see footnote 11, Table 3

TABLE 7

Data on the use testing of the red-pigmented lacquer with siccative [A-4], after radiation curing and oxidative curing
Use testing[15]

|  | UV dispersion | | | |
| --- | --- | --- | --- | --- |
|  | Example 2 | Example 3 | Example 4 (comparison) | Example 6 (EP-A 1 914 253) |
| Resistance to water, 16 h | 5 | 5 | 4 | 3 |
| Resistance to coffee, 16 h | 5 | 5 | 5 | 3 |
| Resistance to red wine, 16 h | 5 | 5 | 4 | 3 |
| Resistance to ethanol/water (50%), 6 h | 5 | 4 | 3 | 1 |
| Resistance to ethanol/water (50%), 16 h | 5 | 3 | 3 | 1 |

[15]see footnote 11, Table 3

Table 3 shows the chemical resistance directly after the radiation curing. An oxidative curing has scarcely taken place at this point in time. The coatings of Examples 1 and 2 according to the invention already have quite good resistances and lie at the level of Comparison Example 4. From experience, the coatings from purely oxidatively drying systems, such as e.g. those from alkyd resins or aqueous polyurethane dispersions based on alkyd resins, are still very soft at this point in time, and testing of the mechanical and chemical resistances was therefore not carried out with these systems.

Substrates which are coated with the binders according to the invention can already be assembled and subsequently cure further oxidatively during storage or during transportation.

The effect of oxidative curing, which takes place at room temperature three days after the radiation curing, is shown in Tables 4 to 7. Examples 2 and 3 according to the invention show better resistances than Comparison Examples 4 and 6 both in the yellow and in the red lacquer without siccative (Tables 4 and 6). This becomes clear in particular in the case of water/ethanol (50%). It is to be emphasized again that Example 4 is indeed based on polyepoxyacrylate, but no polyesters containing unsaturated fatty acids are present. The advantage of the combination of polyepoxyacrylate and polyester containing unsaturated fatty acids as in Examples 2 and 3 thereby becomes clear.

By the addition of siccative (Tables 5 and 7), the resistances of Examples 2 and 3 become still better, whereas in Examples 4 and 6 no improvement is to be seen, since they contain no oxidatively curable groups. The addition of siccative accelerates the oxidative curing. The coatings without siccative will arrive at similarly good results after a longer time.

It likewise becomes clear that the higher contents of aromatic polyepoxyacrylate and polyester containing unsaturated fatty acids in Example 2 lead to better resistances compared with Example 3.

The invention claimed is:

1. A radiation-curable aqueous dispersion comprising a polyurethane acrylate (i), wherein the polyurethane acrylate (i) comprises:
    A) 15 to 35 wt. % of one or more reaction product of (meth)acrylic acid with aromatic glycidyl ethers which are chosen from the group consisting of monomeric, oligomeric or polymeric bisphenol A, bisphenol F, alkoxylated derivatives thereof, and combinations thereof,
    C) 25 to 50 wt. % of the transesterification product of castor oil and an unsaturated fatty acid,
    E) is hydroxypivalic acid and/or dimethylolpropionic acid and
    F) one or more organic polyisocyanates selected from the group consisting of 1,6-Hexamethylene-diisocyanate, 1-isocyanato-3,3,5-trimethyl-5-isocyanatomethylcyclohexane and 4,4'-diisocyanato-dicyclohexylmethane, homologues or oligomers of 1-isocyanato-3,3,5-trimethyl-5-isocyanatomethylcyclohexane, 4,4'-diisocyanato-dicyclohexylmethane with biuret, carbodiimide, isocyanurate, allophanate, iminooxadiazinedione and/or uretdione groups, and mixtures thereof,
    wherein the molar ratios of isocyanate groups in F) to groups in A) to E) which are reactive towards isocyanate are from 0.8:1 to 2.5:1,
    and, optionally, as component (ii) a reactive diluent with at least one group which can undergo free radical polymerization, wherein (i) and (ii) add up to 100 wt. %.

2. The radiation-curable aqueous dispersion according to claim 1, further comprising a component B) which differs from A) and has at least one group which is reactive towards isocyanate and at least one radiation-curable double bond.

3. The radiation-curable aqueous dispersion according to claim 1, further comprising a component D) which has one or more compounds with at least one group which is reactive towards isocyanate, but neither radiation-curable nor oxidatively curable double bonds.

4. The radiation-curable aqueous dispersion according to claim 1, further comprising a component G) which differs from A) to F) and has at least one amine function.

5. The radiation-curable aqueous dispersion according to claim 1, wherein the aqueous dispersion comprises as component (ii) a reactive diluent with at least one group which can undergo free radical polymerization.

6. The radiation-curable aqueous dispersion according to claim 1, wherein component C) is the transesterification product of castor oil and soy bean oil.

7. The radiation-curable aqueous dispersion according to claim 1, wherein the dispersion is free from unsaturated dicyclopentadiene-modified polyester resin.

8. A process for the preparation of the radiation-curable aqueous dispersion according to claim 4, comprising:
    obtaining a polyurethane acrylate (i) by reaction of components A) to E) with component F) in one or more reaction steps, optionally adding a neutralizing agent before, during or after the preparation of the addition product of A) to F) to produce the ionic groups necessary for the dispersing operation; and dispersing by adding water to the addition product of A) to F) or transferring of the addition product of A) to F) into an aqueous reservoir, and optionally chain lengthening by means of component G) before, during or after the dispersing.

9. A method for producing of a coating comprising applying the radiation-curable aqueous dispersion according to claim 1 to a substrate.

10. A coating composition comprising the radiation-curable aqueous dispersion according to claim 1.

11. A method for coating comprising applying the coating composition according to claim 10 in pigmented formulations to wood or plastic.

12. A substrate coated with the coating composition according to claim 10.

13. The radiation-curable aqueous dispersion according to claim 1, further comprising a siccative selected from the group consisting of salts of lead, cobalt, iron, manganese, and copper.

14. The radiation-curable aqueous dispersion according to claim 13, wherein component C) is the transesterification product of castor oil and soy bean oil.

15. The radiation-curable aqueous dispersion according to claim 6, wherein component A) is bisphenol A diglycidyl diacrylate and component F) is 4,4'-diisocyanato-dicyclohexylmethane.

* * * * *